United States Patent [19]

Clark

[11] Patent Number: 5,010,635
[45] Date of Patent: Apr. 30, 1991

[54] SUCKER ROD COUPLING BREAKING TOOL

[76] Inventor: Paul H. Clark, Box 69308, Odessa, Tex. 79769-9308

[21] Appl. No.: 215,064

[22] Filed: Jul. 5, 1988

[51] Int. Cl.$^5$ ............................................. B23P 19/04
[52] U.S. Cl. .................................... 29/426.5; 29/237; 29/240; 81/57.34; 166/85
[58] Field of Search ...................... 29/237, 240, 426.1, 29/426.5; 81/57.15, 57.16, 57.33, 57.34; 166/77.5, 78, 85; 173/164; 285/39; 403/11, 16

[56] References Cited

U.S. PATENT DOCUMENTS

| | | | |
|---|---|---|---|
| 1,861,728 | 6/1932 | Vance et al. | 166/77.5 |
| 2,646,966 | 7/1953 | Lindberg | 225/93 |
| 2,705,614 | 4/1955 | McKibben et al. | 81/57.16 |
| 2,737,839 | 3/1956 | Paget | 81/57.34 |
| 3,463,247 | 8/1969 | Klein | 173/164 |
| 3,802,057 | 4/1974 | Porter | 29/426.5 |
| 3,980,143 | 9/1976 | Swartz et al. | 173/164 X |
| 4,092,881 | 6/1976 | Jurgens et al. | 81/57.34 |
| 4,357,843 | 11/1983 | Peck et al. | 81/57.16 |
| 4,437,218 | 3/1984 | Pridy | 29/240 |
| 4,619,159 | 10/1985 | Kurek | 81/57.34 |

*Primary Examiner*—Joseph M. Gorski
*Attorney, Agent, or Firm*—Marcus L. Bates

[57] ABSTRACT

A coupling removing apparatus by which a threaded rod coupling can be removed from one threaded end of a sucker rod, comprising a main frame and a radially active segmented coupling engaging member which is mounted to the main frame and forms a cavity of a size to receive the made-up coupling on a sucker rod therein. An open ended wrench is mounted to the frame for movement radially towards and away from the centerline of the cavity at a location to engage the wrench flat of the rod. The wrench is moved into engagement with the rod flats adjacent the coupling, then the segments of the coupling engaging member are moved to engage the coupling with great force. The wrenches are counter-rotated about the axis of the rod and coupling with sufficient force to break the threaded connection between the coupling and the rod. The coupling engaging member includes an interior of cylindrical configuration that is divided into three segments. First and second arms are connected at one end by a link, and the other end of the arms are moved toward one another by a hydraulic cylinder. One segment is pivotally mounted on the link; another segment is pivotally mounted on one of the arms; and the third segment is pivotally mounted on the other arm. The segments are aligned along a common longitudinal axis that extends through the coupling cavity and the pivoted end of the wrench. This combination engages the coupling with great force and does not distort nor injure its outer surface.

10 Claims, 4 Drawing Sheets

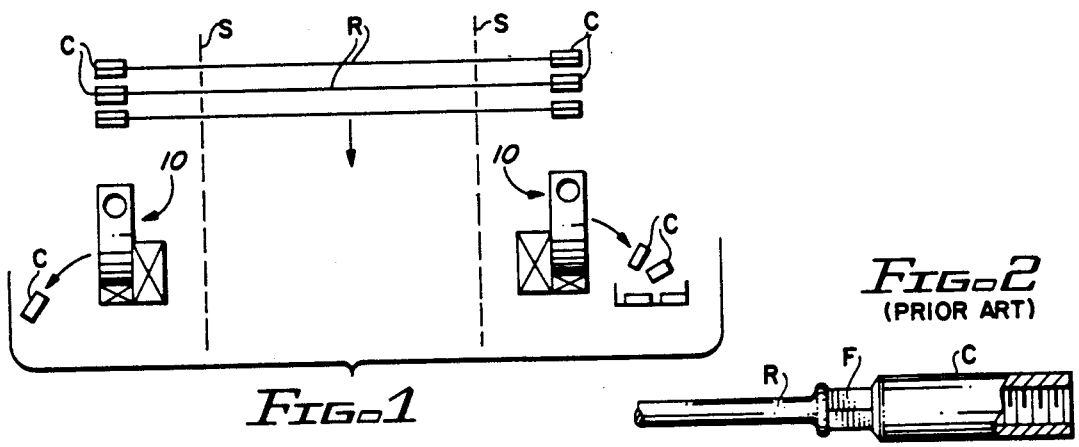
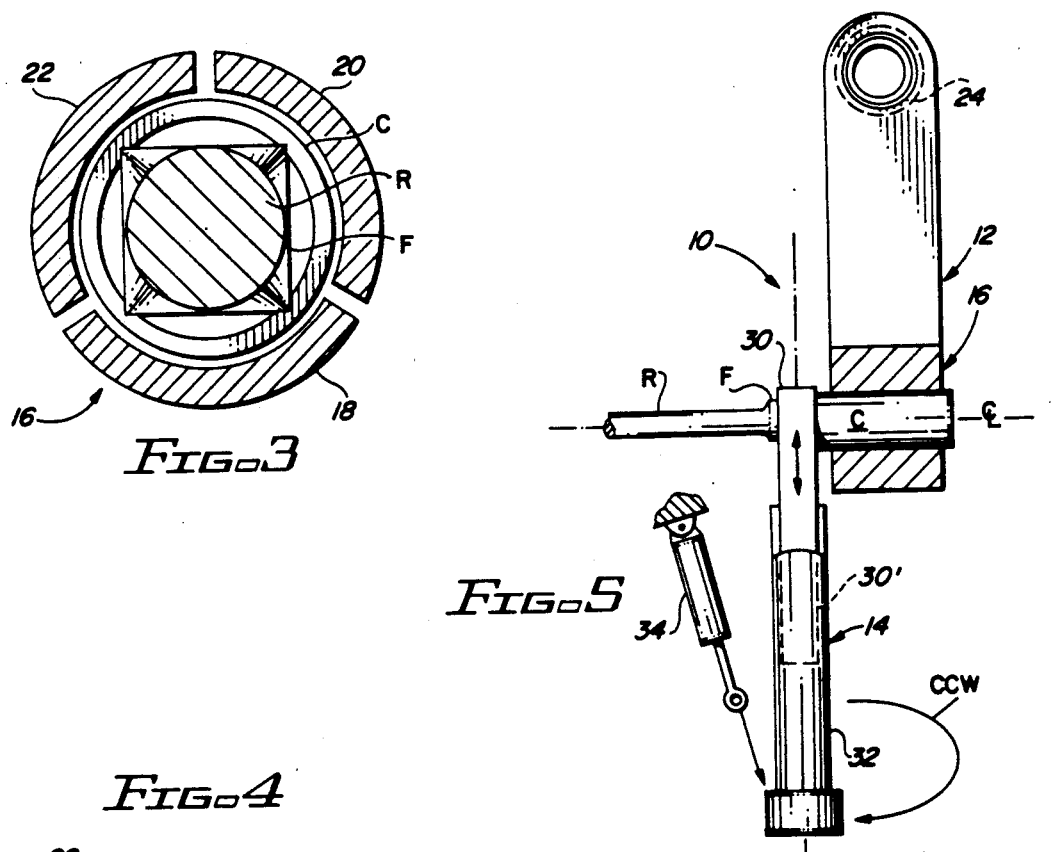
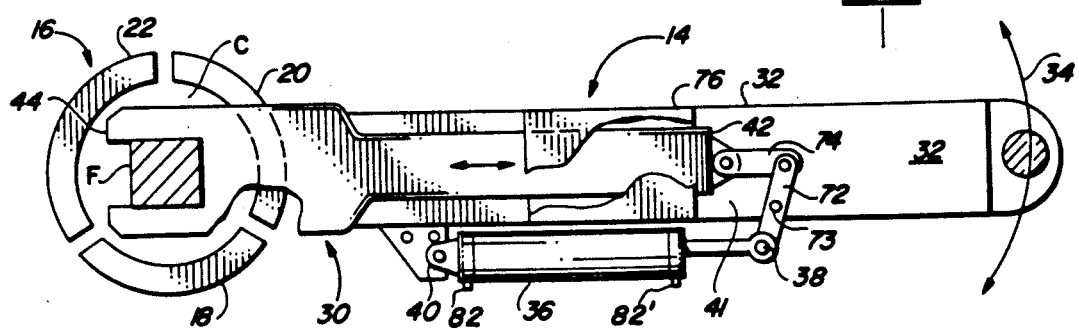

SUCKER ROD COUPLING BREAKING TOOL

BACKGROUND OF THE DISCLOSURE

An oil well of the type having a pumpjack unit will usually have a string of sucker rod extending thousands of feet down the borehole to a downhole pump. From time to time it is necessary to pull the downhole pump and rod string for one reason or another and at this time it is prudent to clean, inspect, and replace any defective part of the string.

The rod string is made up from a plurality of rod joints, each coupled together by a cylindrical threaded coupling member, so that the string can be broken down into a stack of joints. This enables the sucker rod string to be pulled from and run back into the borehole, and facilitates handling and transporting the rod string. Inspection of the rod string therefore necessitates the removal of the coupling member from the opposed ends of the rod joints so that the rod joints, threads, and coupling member can all be thoroughly inspected.

Removing sucker rod couplings from a joint of sucker rods is a laborious task. One must not use high friction jaws, such as found on pipe wrenches, for engaging the coupling because the outer surface of the coupling must remain perfectly smooth and unmarred, otherwise a stress riser will be created and a crack will subsequently develop and the coupling will break. For this reason the rod joints have a wrench flat at opposed ends thereof adjacent to the coupling member so that two wrench flats adjacent to a coupling can be engaged by two open end wrenches in order to break the rod string down into joints. Hence, the coupling members are always left on the rod joint until it is necessary to remove them.

In the past, after the rod string has been broken down into joints, a large hand operated friction wrench with smooth jaws has been used for loosening the coupling from the sucker rod. The wrench flat of the rod is engaged with an open end wrench while the coupling is rotated with the friction wrench. It is often necessary to place sand between the jaws of the wrench and the coupling in order to increase the friction without harming the coupling surface. Because of the great torque previously used to tighten the coupling, it is usually necessary to add an extension pipe to the wrench handle in order to obtain enough leverage to loosen the threaded connection. This is a time consuming and often dangerous endeavor. The friction wrench often breaks because of the great force required for loosening the coupling.

The present invention overcomes the above undesirable features of removing a coupling from the rod by the provision of an apparatus that automatically engages the coupling member and rotates the rod to thereby break the threaded connection that joins the rod and coupling together, so that the coupling can subsequently be easily removed by hand.

SUMMARY OF THE INVENTION

A coupling removing apparatus by which a rod coupling can be broken from one threaded end of a sucker rod comprising a main frame having a first wrench in the form of a radially active segmented coupling engaging member mounted in supported relationship respective thereto and forming a cavity of a size to receive the made-up coupling of the marginal end of a sucker rod therein. The second wrench has an open end and is mounted for radial movement towards and away from the axial centerline of the cavity at a location spaced therefrom to engage the wrench flat found on the end of the sucker rod adjacent to the threads that receive the coupling. Means are provided by which the members of the segmented coupling engaging member moves radially into engagement with the outer surface of the coupling with great force. The second wrench is moved into engagement with the rod flats and thereafter rotated about the central axis of the rod to thereby break the threaded connection between the rod and the captured threaded coupling.

A cascade hydraulic system sequentially operates the apparatus in a cyclic manner to rapidly and efficiently break the threaded connection so that subsequent removal of couplings from the threaded end of the rod is easily achieved.

The segmented coupling engaging member is uniquely attached to pair of clamp arms that are linked together. The members of the segmented clamp are independently pivoted to the clamp arms and link and are self aligning as the segmented clamp removably encapsulates the coupling therewithin and applies an inwardly directed radial force in a new and unobvious manner. This protects the outer surface of the coupling while at the same time prevents deformation of the rod coupling while the threaded connection is being broken. The combination of the two wrenches and their cooperative relationship respective to the coupling and the rod flat provides unexpected advantages heretofore unrealized in the field of cleaning and inspection of sucker rods.

A primary object of the present invention is the provision of a coupling removing apparatus by which a rod coupling can be loosened and removed from a sucker rod without marring the external surface of the coupling.

Another object of the present invention is the provision of a coupling loosening apparatus comprising a plurality of segmented, cylindrical clamp members which are brought to bear against the external surface of a coupling member in a new and unobvious manner so that the rod can be turned to break the threaded connection.

A further object of this invention is the provision of a coupling removing apparatus by which a rod coupling can be loosened and removed from the end of a sucker rod by engaging the coupling with a unique first wrench and engaging the rod flats with a unique second wrench and rotating the first and second wrenches respective to one another to thereby break the threaded connection and enable the coupling to be removed from the end of the rod.

Another and still further object of the present invention is the provision of a combination comprising a first wrench means for engaging a rod coupling, a second wrench means for engaging a rod flat, and means by which the first and second wrenches are rotated respective to one another to thereby break the coupling from the rod.

An additional object of this invention is the provision of a method for removing threaded cylindrical members from the end of threaded coacting members by engaging the outer surface of the cylindrical member with a plurality of smooth cylindrical, segmented, self aligning jaws with great force and rotating the adjacent coacting member in a direction to break the cylindrical member from the adjacent threaded member.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a schematical representation of a process by which couplings are removed from sucker rods;

FIG. 2 is an enlarged, fragmented, part cross-sectional view of the end of a prior art sucker rod and coupling therefor;

FIG. 3 is an enlarged, cross-sectional view that discloses some of the principles of the present invention;

FIG. 4 is a reduced, part cross-sectional view that sets forth some of the principles of the present invention, with some parts being broken away therefrom in order to more fully disclose the apparatus of the present invention;

FIG. 5 is a part diagrammatical, part schematical, representation of a sucker rod coupling removing apparatus made in accordance with the present invention;

DETAILED DESCRIPTION OF THE PREFERRED EMBODIMENT

Figure 6:
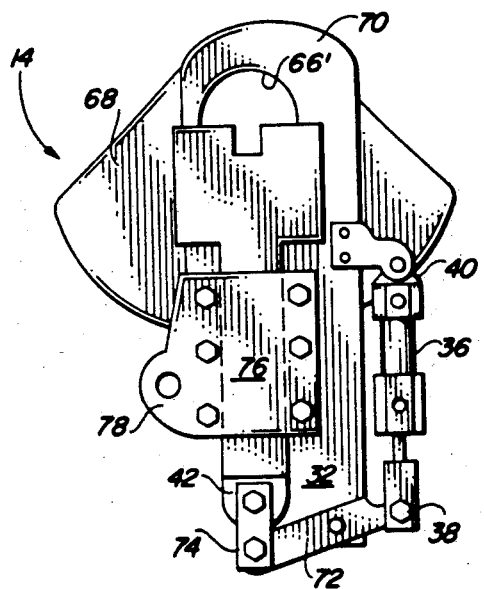
FIG. 6 is a plan view of part of the apparatus of FIG. 7 made in accordance with the present invention.

FIG. 1 discloses spaced pipe racks S upon which a plurality of sucker rods R, having couplings C at opposed ends thereof, are supported. In order for the rods to be cleaned and inspected, the coupling C must be removed from the opposed ends thereof. Apparatus 10, made in accordance with the present invention, is utilized for removing coupling C from the threaded opposed ends rods R. The details of apparatus 10 and its method of use is the subject of the present invention.

FIG. 2 illustrates a prior art sucker rod R having a wrench flat F for receiving an open ended wrench thereabout. The before mentioned threaded coupling C threadedly engages the marginal end of the rod. The coupling C previously should have been made up with great force to avoid the likelihood of the rod string parting thousands of feet downhole in the borehole; and, consequently, prior to this invention, it was extremely difficult to remove the coupling C from the threaded end of the rod without injuring the coupling.

In FIGS. 3-5, together with other figures of the drawings, the present invention 10 broadly comprehends a first wrench 12 and a second wrench 14 axially aligned and rotatable respective to one another about the indicated axial centerline in order to engage and break coupling C from rod R. The first wrench 12 preferably is stationary or non-rotatable, and is provided with a coupling engaging clamp apparatus 16 having a plurality of jaws or clamp members that circumferentially extend about and encapsulate a coupling C. The jaws have a smooth curved interior that conform to the outer circumferential surface of the coupling and are brought into engagement with the exterior surface of coupling C with great force.

As best seen in FIG. 3 (which does not show the second wrench), the jaws of clamp apparatus 16 are made of segments 18, 20, and 22 that have an interior that jointly describe a cylinder and are movable radially towards and away from the central axis thereof to thereby engage the outer surface of the coupling with great force; and, thereafter, to be released from the outer surface of the coupling. In the diagrammatical representation of FIG. 5, numeral 24 indicates a hydraulically actuated cylinder for actuating jaws 16 in a manner which will be more fully described later on herein.

In FIG. 4, the coupling C is not shown. FIG. 5 shows the rod, coupling, first wrench 12 and second wrench 14. In FIGS. 4 and 5, wrench 14 includes an open ended, rod receiving part 30 mounted for slidable movement respective to slide plate 32 so that wrench 30 can be moved radially into mated relationship respective to wrench flat F of FIGS. 3, 4, and 5, and thereafter great rotational force can be applied by the wrench. Hydraulically actuated cylinder 34, when actuated, forces wrench 14 to rotate in a counterclockwise direction while coupling C is held in a non-rotational manner by the first wrench 12. This breaks the threaded connection between the coupling and the rod. The coupling can then be removed by hand.

Hydraulically actuated cylinder 36 (in FIG. 4) has a piston connected at 38 with the cylinder being affixed at 40 to slide plate 32 so that the open ended wrench 30 can be moved radially respective to the centerline of the rod, coupling, and jaws. The wrench member 30 is received on the side 41 of the slide plate. The end 42 of the open ended wrench 30 is connected to the piston of the cylinder assembly 36 by the indicated linkage 72, 73, and 74. The marginal end 42 of the wrench 30 is encapsulated within a guide 76 for radial movement of the wrench. End 44 of the wrench receives the illustrated cutout within which flat F of the sucker rod is received.

Figure 9:
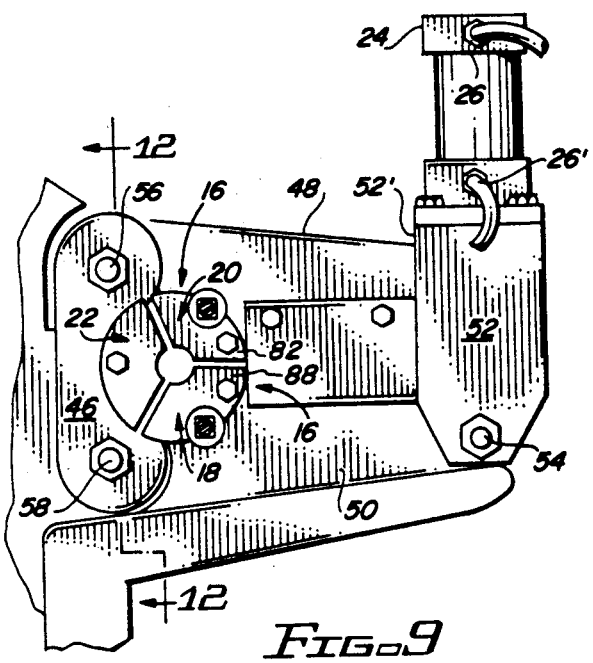
FIG. 9 is a fragmentary view of the side opposite of the apparatus disclosed in FIG. 7.
Figure 7:
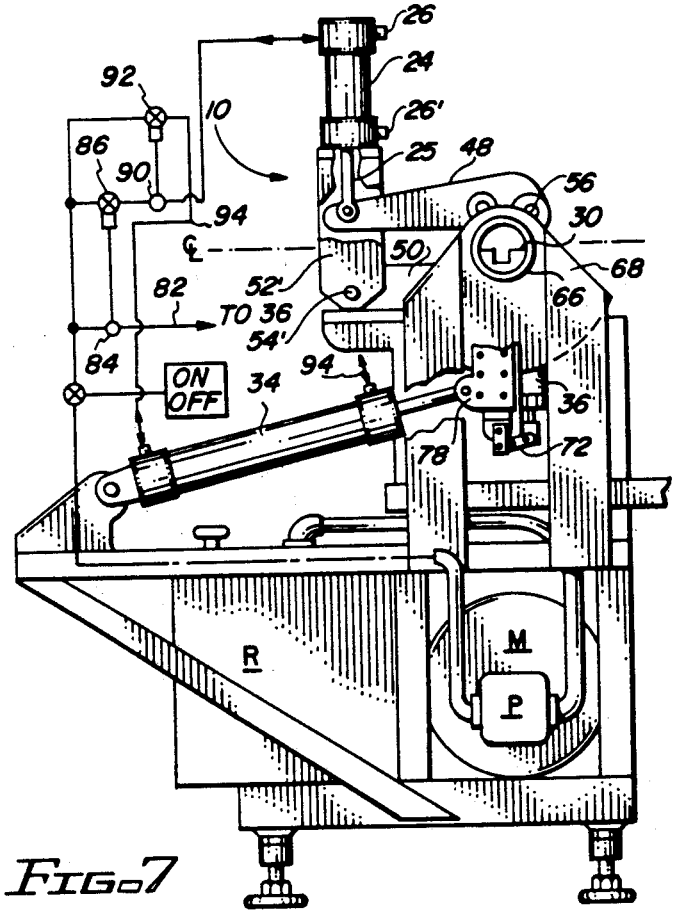
FIG. 7 is an elevational end view of a sucker rod coupling removing apparatus made in accordance with the present invention, with some parts being broken away therefrom in order to disclose additional details thereof.
Figure 8:
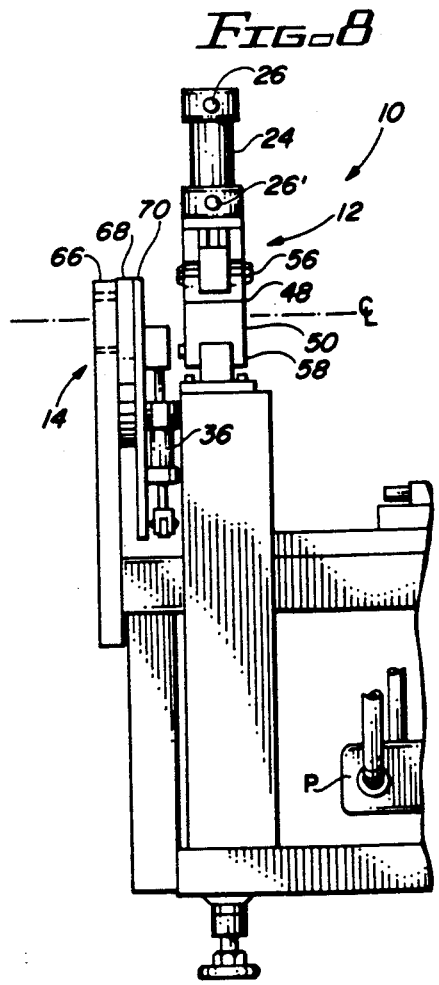
FIG. 8 is a side view of the apparatus disclosed in FIG. 7.
Figure 10:
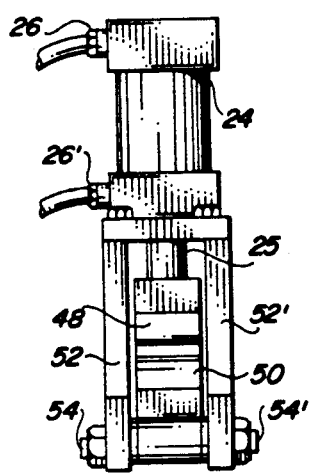
FIG. 10 is an isolated, elevational, detail of part of the apparatus disclosed in FIGS, 7-9.
Figure 11:
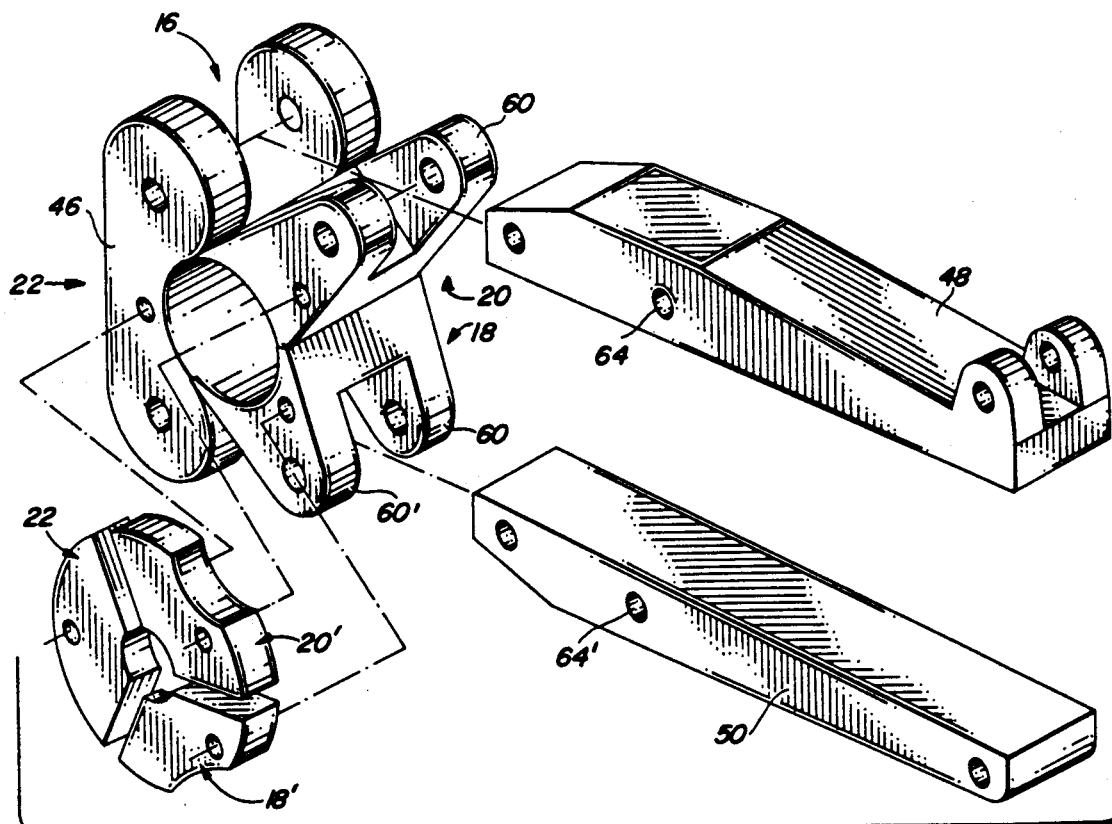
FIG. 11 is an exploded view of part of the apparatus disclosed in FIGS. 7-10.

In FIGS. 7, 9, and 11, together with other figures of the drawings, the first wrench 12 is seen to comprise a link 46 pivotally connected at opposed ends thereof to an upper clamp arm 48 and lower clamp arm 50. A yoke 52 is pivotally connected to the free end of the lower clamp arm by yoke pin 54. The before mentioned hydraulic cylinder 24 is supported by the illustrated plate formed on the central yoke member, and the piston of cylinder 24 is connected at 54' to move the free end of the upper clamp arm 48. This enables upper clamp arm 48 to be forced toward the lower clamp arm 50 upon extension and rectraction of the piston. Upper link pin 56 and lower link pin 58 extends through link 46 and directly connects the link for pivotal motion respective to the upper and lower clamp arms 48 and 50.

Figure 12:
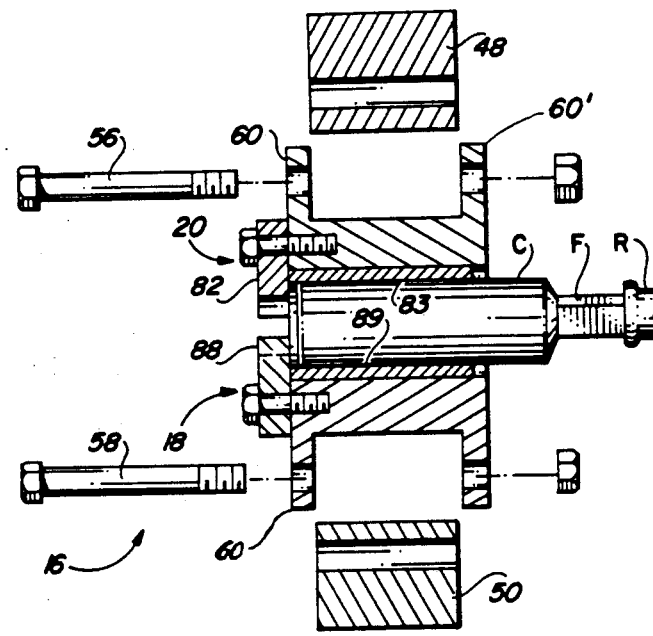
FIG. 12 is a cross-sectional view taken along the indicated centerline of FIGS. 7 and 8; and, FIG. 13 is an exploded view of the apparatus disclosed in FIGS. 11 and 12.
Figure 13:
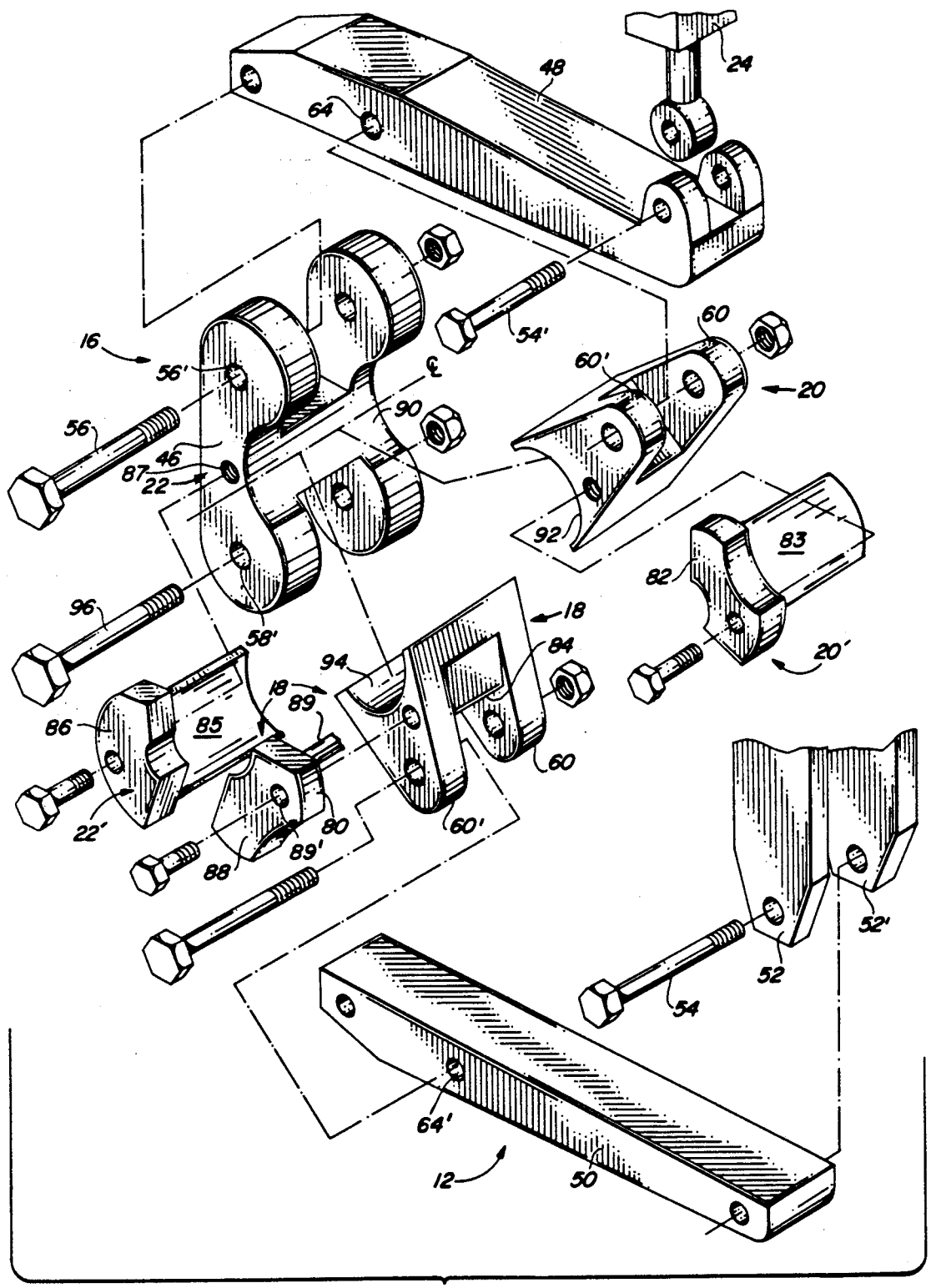

In FIGS. 12 and 13, the segmented clamp members 18 and 20 are similar in construction and each have spaced mounting ears 60, 60' formed integrally thereon and extending therefrom. The ears are pivotally connected at 64 and 64' to a medial length of clamp arms 48 and 50 by means of a pin which is received through both ears 60, 60' and apertures 64, 64' of arm 48,50. The pivotal connection of clamp members 18 and 20 and the pivotal connection provided by the link and clamp arms aligns the clamp assembly 16 with a coupling in a new and unusual manner and brings about unexpected results. In FIG. 13, segmented clamp members 18, 20, 22, respectively, have an inner cylindrical surface 94, 92, 90, respectively, that cooperates together in the manner of FIGS. 9, 11, and 12 to form a segmented, cylindrical chamber within which coupling C is received in captured relationship therewith. Each of members 18, 20, 22 removably receive a liner 83, 85, 89 to which a segmented stop member is integrally attached. The stop member illustrated in FIG. 11 has the liner removed therefrom. FIG. 12 illustrates the cooperative action between the stop member, liner, segmented coupling clamp, and coupling C. The liners are changed to accommodate different diameter couplings. The combination liners and stop members are bolted directly to the members 18,20,22 in the illustrated manner of FIGS. 9 and 12.

Looking again to the details of wrench 14, and in particular to FIGS. 4, 6, 7, and 8, slide plate member 32 is apertured at 66' and is held adjacent to fixed apertured plate member 68, with the two apertures being aligned co-axially. A bearing member 66, which can take on any number of different forms, fastens plate members 32 and 68 together at apertures 66'. This maintains the two apertured upper ends of the plate members axially aligned with respect to the cavity formed by clamp member 16 so that when the marginal end of a sucker rod having a coupling attached thereto is moved along the indicated centerline of FIGS. 7 and 8, coupling C is received within clamp member 16 in the illustrated manner of FIG. 12. The terminal end of the coupling abuttingly engages stop members 82, 86 and 88. The segments of the clamp, when moved radially towards a coupling, self-align with the outer surface of the coupling while the coupling is grasped with a force proportional to the hydraulic pressure effected at 26 and thereby secures the coupling against rotation in a manner that avoids marring the outer surface thereof.

In FIG. 7 a motor M drives a pump P which receives hydraulic fluid from reservoir R and provides hydraulic pressure at main control valve 80. The main control valve 80 is turned on by the operator and is turned off by the action of swing plate 32. Control valve 80 supplies hydraulic pressure at 82 to the hydraulic cylinder 36. Sensor 84 senses the pressure within cylinder 36 and opens control valve 86 when the pressure reaches a predetermined desired magnitude.

The valve 86 provides hydraulic pressure to cylinder 24. The pressure at 24 is sensed at 90 and valve 92 is opened when the pressure exceeds a predetermined magnitude. Valve 92 is connected at 94 to provide hydraulic pressure for cylinder 34.

Hence, a cascade type hydraulic system is provided wherein opening valve 80 automatically sequences the system, with the cylinder 36 first being actuated when the main control valve 80 is turned on, and after the second wrench has been extended into engagement with the sucker rod flat, the segmented clamp is next actuated by hydraulic cylinder 24. When the desired pressure at cylinder 24 is achieved, pressure is next effected at cylinder 34 to pivot the slide plate and break the connection.

The operation is carried out as follows: A sucker rod R having coupling C thereon is moved into axially aligned relationship respective to the first and second wrenches 12 and 14. Rod R is then moved axially into the cavity formed by clamp 16, with the flat F being positioned so that when the cycle of operation is commenced, cylinder 36 extends the piston thereof, causing wrench 30 to be moved into engagement with the flat F of the sucker rod. After wrench 14 has engaged flat F of sucker rod R, hydraulic pressure is applied at 26 to cylinder 24, which moves arm 48 pivotally respective to pivot pin 56, thereby radially extending the three segments of clamp 16 toward coupling C and engages the coupling with great force. As soon as sufficient pressure has built up within cylinder 24 to secure the coupling against rotation, cylinder 34 is activated and rotates the second wrench 14 to break the threaded connection between the rod and coupling.

This is achieved by the above described cascade hydraulic system wherein a pressure sensitive bypass valve is triggered by each sequential operation. Specifically, hydraulic pressure from pump P is conducted to main control valve 80 which, when opened, first applies pressure along line 82 to cylinder 36, and when the pressure within cylinder 36 exceeds 500 psi, a pressure sensitive valve 86 is opened to supply hydraulic pressure to cylinder 24. This assures that wrench 30 is moved radially toward the rod flat prior to clamp 16 moving into engagement with the coupling. When the pressure within cylinder 24 has reached a suitable magnitude, a second pressure sensitive valve causes hydraulic pressure to automatically be applied to cylinder 34, by means of pressure sensitive valve 92 with the pressure being of the required magnitude for moving the second wrench with a force which breaks the threaded connection between the rod and coupling. A limit switch is placed in the path of the second wrench 14 that relieves the hydraulic pressure at cylinders 36, 24, 34, and thereafter, retracts cylinder 24, arm 48, and cylinder 36, so that the apparatus is in proper condition for receiving the next coupling within the cavity formed by clamp 16.

I claim:

1. Method of loosening a rod coupling that is threadedly attached to an end of a joint of sucker rod having wrench flats thereon, said rod coupling has a smooth outer surface and an axial centerline; comprising the steps of:

surrounding the coupling with a radially active coupling engaging means; providing said radially active coupling engaging means with three longitudinally extending clamp members that have a circumferentially extending interior that jointly extend 360 degrees about the axial centerline of the coupling; and, pivotally attaching a pair of clamp arms to opposed ends of a link and pivotally attaching one said clamp member to the link, another clamp member to one arm, and the other clamp member to the other arm;

and moving the arms towards one another with a scissor-like action to grasp the coupling between the clamp members with great force;

extending an open-ended wrench into engagement with the wrench flat of the joint of sucker rod, and then radially moving the coupling engaging means into engagement with the outer surface of the coupling with a force that is of a magnitude required to break the threaded connection between the rod and coupling when the rod is rotated respective to the coupling;

rotating the open-ended wrench respective to the coupling engaging means until the threaded connection is broken and then rotating the coupling respective to the rod to remove the coupling from the end of the rod.

2. Method of removing a rod coupling that is threadedly attached to the end of a joint of sucker rod having a wrench flat, said coupling having a longitudinal axial centerline; comprising the steps of:

providing a radially active coupling engaging means having three longitudinally extending clamp members and a circumferentially extending interior that jointly extend 360 degrees about the axial centerline of the coupling; and, pivotally attaching a pair of clamp arms to opposed ends of a link and pivotally attaching one of the three clamp members to the link, another of the three clamp members to one arm, and the other of the three clamp members to the other arm;

surrounding the coupling with said radially active coupling engaging means by moving the clamp arms radially towards one another with a scissor-like action to grasp the coupling therebetween the great force;

hydraulically extending an open-ended wrench into engagement with the wrench flat of the joint of sucker rod, and then hydraulically moving the coupling engaging means into engagement with the outer surface of the coupling with a force that is required to break the threaded connection between the rod and coupling;

continuing to hydraulically extend the open-ended wrench until the hydraulic pressure exceeds a first value, flowing hydraulic fluid to said radially active coupling engaging means in response to the pressure exceeding said first value and continuing to flow fluid to said coupling engaging means until the pressure exceeds a second value, and then continuing flowing hydraulic fluid, thereby rotating said open-ended wrench respective to the coupling engaging means until the threaded connection is broken and then releasing the coupling engaging means, and thereafter rotating the coupling respective to the rod, thereby removing the coupling from the end of the rod;

discontinuing the flow of hydraulic fluid in response to the wrench rotating a distance required to break the threaded connection and then hydraulically retracting the open ended wrench and the coupling engaging means, and retracting the wrench back into position for receiving another rod coupling.

3. A coupling removing apparatus by which a rod coupling threadedly made up respective to one end of a sucker rod can be removed therefrom, the sucker rod having wrench flats thereon adjacent the coupling, said apparatus comprising:

a main frame; a radially active segmented coupling grabber for engaging a rod coupling; means mounting said coupling grabber in supported relationship respective to said main frame; means forming a cavity within said coupling grabber of a size to receive a made-up coupling of a sucker rod therein; a central axis extends through the cavity of the coupling grabber; the segments of the coupling grabber have a smooth coupling engaging face, said coupling grabber is of a size to circumferentially extend about the coupling whereby the coupling can be axially received within the cavity;

a wrench means mounted on said main frame at a location spaced from said coupling grabber for movement towards and away from the central axis of the cavity; said wrench means is adapted to engage the sucker rod wrench flats; and means for moving said wrench means into engagement with the sucker rod wrench flats adjacent a coupling of a sucker rod when the made-up coupling is received within the cavity of the coupling grabber;

means moving the segments of said segmented coupling grabber towards the central axis of the coupling grabber cavity with great force; and, means rotating the wrench means about the longitudinal central axis of the rod and coupling with sufficient force to break the coupling from the rod when a made-up coupling is engaged by the coupling grabber;

the wrench means includes a slide plate member having a rotatable end opposed to a pivoted end; an aperture at said pivoted end; said wrench means is slidably mounted to said slide plate member, means for rotating the rotatable end of said slide plate member about the pivoted end thereof, another plate member having opposed ends with one end fixed respective to said main frame and the other end being apertured; the aperture of the slide plate member and the aperture of said another plate member being aligned coaxially; hollow journal means connecting the axially aligned apertured ends of the slide and another plate member together with the rotatable end of said slide plate member rotating about the apertured end thereof.

4. The apparatus of claim 3 wherein said coupling grabber is comprised of an annular cylinder that is divided into three segments;

first and second arms having opposed ends and connected to each other at one end thereof by a link, means moving the other end of the arms toward one another; one said segment is pivotally mounted on said link; another said segment is pivotally mounted on one of said arms; and the third said segment is pivotally mounted on the other of said arms; said segments jointly form said cavity.

5. Apparatus by which a threaded cylindrical member having an outer cylindrical surface can be loosened respective to an elongated complementary threaded member, said apparatus includes a main frame, a clamp member mounted to said main frame, said clamp member having a plurality of radially active segmented members that form a cylindrical enclosure within which the threaded cylindrical member can be telescopingly received in a removable manner;

means for forcing the segmented members of the cylindrical enclosure to assume a range of different diameters, the smallest diameter of said range of different diameters being smaller than the outside diameter of the threaded cylindrical member and the largest diameter of said range of diameters being larger than the outside diameter of the threaded cylindrical member; the cylindrical enclosure has a central axis;

wrench means mounted to said main frame and having a pivoted end for engaging the complementary threaded member and a pivotal end spaced therefrom for movement about the central axis of the cylindrical enclosure; means moving said wrench means radially into engagement with the complementary threaded member and out of engagement with the complementary threaded member; said clamp member having a smooth jaw formed on the inner surface of each segmented member, said clamp member encloses the outer cylindrical surface of the threaded cylindrical member when the cylindrical member is axially received within said cylindrical enclosure, whereby: said wrench means is moved into engagement with said complementary threaded member, said radially active segmented members engage said threaded cylindrical member, said wrench means, when rotated respective to said threaded cylindrical member, breaks the threaded connection to enable the threaded cylindrical member to be removed from the elongate complementary threaded member;

a first plate member having a pivoted end spaced from a rotatable end, said wrench means is slidably mounted in a reciprocating manner respective to said first plate member, said first plate member having an aperture at the pivoted end thereof and means turning the wrench means and plate member at the rotatable end thereof, a second plate member having one end fixed to said main frame and the other end being apertured; the apertured ends of the first and second plate members are coaxially aligned; hollow journal means connecting the coaxially aligned apertured ends of the first and second plate members together for relative pivotal movement therebetween, with the first plate member rotating about the axis of the apertured end and means pivotally moving the first plate member; and means reciproctingly moving the wrench means 6. The apparatus of claim 5 wherein said radially active segmented members is comprised of three segments that jointly form an annular cylinder;

first and second arms having opposed ends and connected to each other at one end by a link means, means moving the other end of the arms toward one another; means pivotally mounting one of said segments on said link means; another of said segments being pivotally mounted on one of said arms; and the third of said segements being pivotally mounted on the other of said arms; said segments having a smooth cylindrical interior that is aligned along a common axis that extends parallel to an axis drawn through the pivoted end of said wrench means.

7. The apparatus of claim 5 wherein two of said segments have lugs attached thereto by which the two said segments are mounted to said arms for pivotal movement therewith and by which the two said segments are moved radially toward and away from one another.

8. A coupling removing apparatus by which a rod coupling that has been threadedly made up respective to a sucker rod can be removed from one end of the sucker rod, the sucker rod has wrench flats formed thereon adjacent the coupling, said apparatus comprising:

a main frame, a radially active segmented clamp for engaging a rod coupling, said clamp is mounted in supported relationship respective to said main frame and forms a cavity of a size to receive the made-up rod coupling therein; said cavity having an axial centerline;

means for moving the segments of said segmented clamp towards the axial centerline of the cavity with great force;

a wrench mounted for movement radially towards and away from the axial centerline of said cavity at a location spaced from said segmented clamp to engage the rod wrench flats when a made-up coupling is enclosed within said cavity; means moving said wrench into engagement with the rod wrench flats adjacent a coupling enclosed within said cavity;

means rotating the wrench about the axial centerline of the cavity to thereby rotate the rod connected to a coupling held by the segmented clamp with sufficient force to break the coupling from the rod;

a slide plate member, said wrench is slidably mounted to said slide plate member, said slide plate member having a pivoted end opposed to an other end, an aperture at the pivoted end thereof, and means for turning the other end of said slide plate member, a second plate member having one end fixed to said main frame and the other end being apertured; the apertured end of said slide plate member is aligned with the apertured end of said second plate member; hollow journal means connecting the axially aligned apertured ends of the slide and second plate members together with said other end of said slide plate member rotating about the apertured end; hydraulic cylinder means for pivotally moving said slide plate member; and hydraulic cylinder means for radially moving the wrench respective to the slide plate member.

9. The apparatus of claim 8 wherein said segmented clamp is an annular cylinder that is divided into three segments; a link;

first and second arms having opposed ends and connected to each other at one end by said link, means moving the other end of the arms toward one another, one of said three segments is pivotally mounted on said link;

another of said three segments is pivotally mounted on one of said arms;

and the third of said three segments is pivotally mounted on the other of said arms; said segments being aligned along a common axis that extends parallel to a line drawn through the pivoted end of said wrench.

10. Apparatus by which a threaded cylindrical member having an outside diameter and a central axis can be loosened respective to an elongate complementary threaded member, said apparatus includes a main frame, a clamp member mounted to said main frame, said clamp member having a plurality of radially active segmented members that form a cylindrical enclosure within which the cylindrical member can be telescopingly received in a removable manner;

means forcing the segmented cylindrical enclosure to assume a range of different inside diameters, the smallest diameter of said different inside diameters being smaller than the outside diameter of the cylindrical member and the largest diameter of said different inside diameters being larger than the outside diameter of the cylindrical member;

wrench means mounted to said main frame and having a pivoted end for engaging the complementary threaded member and a rotatable end spaced therefrom for movement about the central axis of the cylindrical member; means moving said wrench means radially into engagement with the complementary threaded member and out of engagement with the complementary threaded member; whereby: said wrench means engages said complementary threaded member, said radially active segmented members engage said cylindrical member, said wrench means is rotated respective to said cylindrical member to break the threaded connection so that the cylindrical member can be removed from the elongate complementary threaded member;

said radially active member is comprised of three segments that jointly form an annular cylinder; first and second arms having opposed ends and connected at one end by link, means moving the other end of the arms toward one another, means pivotally mounting one of the three segments on said link; another of said three segments being pivotally mounted on one of said arms; and a third of said three segments being pivotally mounted on the other of said arms; said three segments having a smooth cylindrical interior that is aligned along said central axis which extends parallel to an axis drawn through the pivoted end of said wrench means;

wherein two of said segments have lugs attached thereto by which each of the two of said segments are mounted to said arms for pivotal movement therewith and by which each of the said three segments are moved radially toward and away from one another;

said wrench means is slidably mounted in a reciprocating manner to a first plate member having a pivoted end spaced from a rotatable end, an aperture at the pivoted end of said plate member, and means turning the wrench means at the rotatable end thereof, a second plate member having opposed ends with one end fixed to said main frame and the other end being apertured and axially aligned with the apertured end of the first plate member; hollow journal means for connecting the axially aligned apertured ends of the first and second plate members together for relative pivotal movement therebetween, with the first plate member rotating about the axis of the apertured end thereof; and a hydraulic cylinder means for pivotally moving the first plate member.

* * * * *

UNITED STATES PATENT AND TRADEMARK OFFICE
CERTIFICATE OF CORRECTION

PATENT NO. : 5,010,635
DATED      : APRIL 30, 1991
INVENTOR(S): PAUL H. CLARK

It is certified that error appears in the above-identified patent and that said Letters Patent is hereby corrected as shown below:

Column 1, line 23, substitute --rod-- for "rods";

Column 2, line 19, insert --a-- before "pair";

Column 9, line 14, substitute --said-- for "the";
         line 41, insert a period after "means";

Signed and Sealed this

Tenth Day of January, 1995

Attest:

BRUCE LEHMAN

*Attesting Officer*   *Commissioner of Patents and Trademarks*